United States Patent [19]

Riedl

[11] 4,124,738
[45] Nov. 7, 1978

[54] SEAL CONSTRUCTION FOR PRIMARY CELLS

[75] Inventor: Werner Riedl, Ellwangen, Fed. Rep. of Germany

[73] Assignee: Varta Batterie Aktiengesellschaft, Fed. Rep. of Germany

[21] Appl. No.: 784,242

[22] Filed: Apr. 4, 1977

[30] Foreign Application Priority Data

Apr. 30, 1976 [DE] Fed. Rep. of Germany ........ 2619177

[51] Int. Cl.² .................... H01M 2/00; H01M 2/12
[52] U.S. Cl. ................................ 429/56; 429/171; 429/185
[58] Field of Search .............. 429/56, 163, 164, 171, 429/172, 174, 185

[56] References Cited

U.S. PATENT DOCUMENTS

| 2,444,872 | 7/1948 | Deibel | 429/167 |
|---|---|---|---|
| 2,463,454 | 3/1949 | Birdsall | 429/168 |
| 2,611,793 | 9/1952 | Simpson | 429/164 |
| 3,016,414 | 1/1962 | Priebe | 429/164 X |
| 3,219,488 | 11/1965 | Southworth, Jr. | 429/56 |
| 3,802,923 | 4/1974 | Spanur | 429/172 X |
| 3,861,962 | 1/1975 | Harada et al. | 429/168 |

*Primary Examiner*—Anthony Skapars
*Attorney, Agent, or Firm*—Weiser, Stapler & Spivak

[57] ABSTRACT

The cell cup of a primary element has a turned-over (crimped) rim engaging the underside of a synthetic plastic sealing member. The cell rim is turned over to between 140° and 190° and is engaged by the underside of the sealing member to the extent of 50 to 100°. The end of the crimped rim abuts against a protrusion from the sealing member.

5 Claims, 5 Drawing Figures

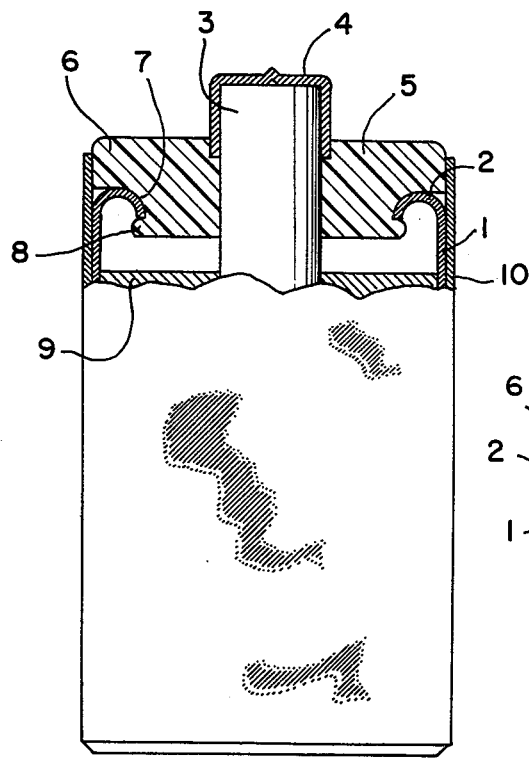
FIG. 1
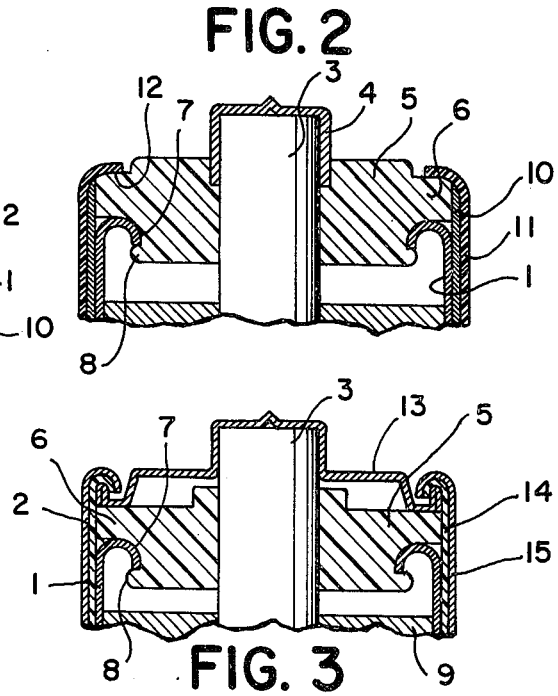
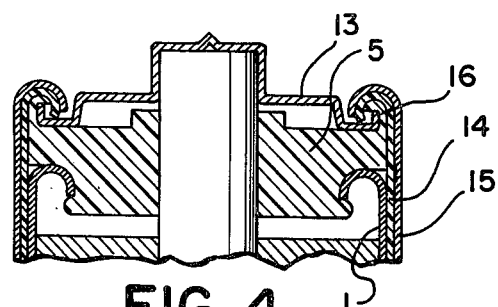
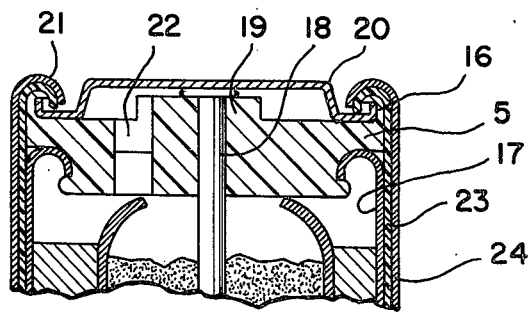

SEAL CONSTRUCTION FOR PRIMARY CELLS

The invention relates to a galvanic primary element having a cylindrical cell cup which is closed off by a synthetic plastic sealing element whose underside is gripped by the turned-over, or crimped rim of the cell cup.

Primary elements with acid or akaline electrolytes generally have cylindrical shape and a vessel-like cell cup for receiving the electrode materials. They also have a sealing element of synthetic material which closes the primary cell at its head end in liquid-tight manner, and they have a positive and a negative contact disc together with an insulating envelope.

In primary elements in which the negative solution electrode takes the form of a cell cup (Leclanche cell), various constructions are known in which the sealing element made of synthetic material is pressed like a stopper into the cell cup. This synthetic material sealing element may, for example, be forced in between an indentation in the cell cup and the crimped upper rim of the cell cup (see U.S. Pat. No. 3,694,267). In other forms of construction, the sealing element rests upon the electrode and is maintained in position by the flanged edge of the cell cup (U.S. Pat. No. 3,016,414).

These known modes of realization of synthetic material seals have the disadvantage that they occupy a relatively large fraction of the available cell volume. This therefore is not available for the active electrode materials. In addition, if excess pressure develops in the primary cell, these stopper type end seals are not sufficiently elastic and result in a swelling along the longitudinal axis which greatly exceeds the permissible standard length of the primary elements. If excess pressures suddenly arise, as may occur for example if the primary element is connected into its circuit with wrong polarity, such stopper-type closures of synthetic material may be explosively expelled from the cell cup.

This is avoided by synthetic plastic seals in which the synthetic plastic seal penetrates only partially into the cell cup with its turned-over edge, and which accomplishes its sealing by means of an overlapping edge or rim at the head end of the cell cup. For example, in German patent 2,238,406 there is described a sealing element which features a flutter valve formed by a flange which is resiliently elastic and which protrudes inwardly into the turned-over rim of the cell cup, and a thin annular flange which rests resiliently upon the outer head end.

According to German patent publication (Auslegeschrift) to 1,496,189 a resilient annular flange protrudes into the turned-over rim of the cell cup and an annular auxiliary flange engages the outside of the cell with turned-over rim, the latter providing an additional sealing effect.

These last-named modes of realization are commonly referred to as top seals. In order to insure the functioning of the sealing element, they too require an overlying turned-over edge of the outer cell envelope, ordinarily in the form of a steel jacket, in order to press the resiliently engaged sealing flaps against the cell cup. In such arrangements, the actual sealing effect is therefore achieved only upon final assembly of the primary element when the cell envelope which encloses the cell cup and the sealing element is turned over or crimped.

In the interval between insertion of the electrode mass and crimping of the cell envelope the surface of the electrode in such arrangements is therefore inadequately protected against drying. Particularly for small cell dimensions or for particular electrolytes such as for example zinc chloride electrolytes of comparatively high concentration or in the case of various akaline electrolytes, this leads to a pronounced variation in the electrical characteristics of the primary element. It is therefore the practice to place, immediately after insertion of the electrode mass, an additional disc coated with paraffin, or a bitumen or wax casting directly upon the electrode surface.

Since it is only the crimping of the cell housing which achieves the true sealing, there arises an additional disadvantage, namely a fatigue effect or shrinkage of the sealing materials during storage, so that optimum tightness between seal and cell cup is no longer assured. To prevent loss of sealing after storage, it is therefore frequently necessary to place additional elastic sealing material on the rim of the cell cup.

Accordingly, it is a primary object of the invention to provide a seal of the above-mentioned type (top seal) which is mounted immediately after insertion of the electrode mass and of the electrolyte.

It is another object to provide such a seal which, immediately upon mounting, already provides protection for the primary cell against drying in a manner analogous to stopper seals and without additonal sealing material.

It is still another object to provide such a seal which provides its sealing function independently of the possible use of an additional crimped cell envelope.

These objects and others which will appear are accomplished in accordance with the invention as follows. The rim of the cell cup is turned over, or crimped, to the extent of at least 140° and up to about 190° and preferably about 170° to about 190°. The crimped portion bears, in enclosing and sealing configuration, against a flanged portion on the underside of the seal to the extent of at least 50°, and up to about 100°. The end of the crimped portion abuts in self-limiting manner against a protrusion from the sealing element.

As is conventional, the synthetic plastic sealing element has a central aperture for passage of the electrode current take-off.

The desired degree of precompression between sealing element and crimped portion of the cell cup can be achieved especially successfully if materials are used which have rubber-like elastic properties. The invention contrasts with known forms of construction in which the cell cup is crimped in angular or curvilinear configuration, but at most to the extent of a 90° angle. In accordance with the invention, there cannot be any cutting of the cell cup rim into the sealing material even before reaching its final position. This is because the interior semi-circular configuration of the cell cup rim concentrically compresses the protrusion from the sealing element and extends behind the crimped rim in self-limiting manner only after reaching its final position.

Subsequently, any desired cell enclosure can be applied to this cell. In so doing, however, the self-sealing synthetic seal protects the electrode mass already present in the cell cup in every case, immediately after it is applied, against loss of electrolyte moisture. This takes place independently of the point in time at which there is applied the additional enclosure of the primary element, made of cardboard, synthetic plastic, metal or combination of these materials.

The radius of crimping of the cell cup rim depends upon the cell diameter and lies between 0.7 and 2.5 millimeters for the conventional international standard cell dimensions of between 10 to 35 millimeters.

The synthetic plastic sealing arrangement embodying the invention can be used for conventional primary elements with acid electrolytes as well as for primary elements with akaline electrolyte (alkali manganese cell). In these, the cell cup made of steel is also crimped to the extent of at least 140° and at most about 190°, and the sealing element contains an aperture for the passage of the negative conductor which is connected to a negative contact plate. Particularly in such cells, the sealing element may be provided with a fracture point, e.g. in the form of a frangible membrane. However, this can also be used with primary elements of Lechlanche construction.

For further details, reference is made to the discussion which follows in the light of the accompanying drawings wherein FIG. 1 shows, partly in cross-section, a primary element having a top seal closure and a label envelope;

FIG. 2 shows a cross-section through the same cell with label and synthetic plastic envelope;

FIG. 3 shows a cross-section through a primary element with top seal closure and contact cap as well as metallic clad envelope;

FIG. 4 shows the same primary element as FIG. 3 with a structurally further improved sealing element; and FIG. 5 shows a cross-section through a primary element with akaline electrolyte and a seal embodying the invention.

The same reference numerals are used in the different figures to designate similar elements.

According to FIG. 1, the upper rim of cell cup 1 is crimped to the extent of an angle of more than 140° and less than 190°. This crimped portion is designated by reference numeral 2. The positive electrode conductor 3 with contact cap 4 passes through sealing element 5. In this embodiment the cell cup is also the solution electrode made of zinc. The underside of the sealing element then bears with its flanged portion 6 in both closed configuration and with sealing effect against the crimped rim of the cell cup, i.e. the crimped portion, to the extent of an angle of at least 50° and at most about 100°. The rim of the cell cup, or rather the end of the crimped portion then extends behind the bearing protrusion 8 of seal 5 and is there positioned in self-limiting manner. Within the cell cup, the electrode mass 9 contained therein is therefore protected against moisture loss even before the label enclosure 10 is applied. The sealing region is designated by reference numeral 7.

The form of seal 5 acording to FIG. 2 corresponds in substance to the seal of FIG. 1. Additionally, there is provided in this cell a synthetic plastic tube 11, which may either be imprinted or colorless and whose upper rim can conveniently be inserted into a corresponding recess 12 in the upper side of sealing element 5.

In the embodiment of the primary element according to FIG. 3, there is applied to the positive conductor electrode 3 a contact cap 13 which extends over the upper surface of the cell. An insulating envelope 14 adjoins the cell cup 1 and a metal housing 15 is crimped over this insulator envelope as well as over contact cap 13.

In the embodiment of FIG. 4, the cell cup, or rather the negative solution electrode 1 is again provided with a synthetic plastic envelope 14 as well as metal housing 15. The sealing element 5 further has on its top surface an outer annular flange 16 which then lies together with synthetic plastic envelope 14 over the rim flange of contact cap 13.

Finally, in FIG. 5 the sealing element according to the invention is shown used in an otherwise known akaline primary element, particularly an akali manganese cell. The cell cup 17 there consists preferably of steel and also has at its upper rim the crimping according to the invention for positioning the top seal closure 5. The closure 5 has an aperture 18 for receiving the negative conductor 19 and the negative contact disc 20. It has an edge with an upstanding flange 21 and is crimped in by the annular flange 16 of the sealing element and also by insulating envelope 23 and metal envelope 24. As a frangible element the sealing element 5 may, for example, have a membrane valve 22, known in itself, which operates in response to sudden excess pressure, without thereby forcing the seal 5 out of the crimped steel cup 17.

I claim:

1. A galvanic primary element having a cylindrical cell cup closed by a synthetic plastic sealing element,
   the cell cup having a crimped rim which engages the underside of the sealing element,
   the rim of the cell cup being crimped to the extent of at least 140°, and at most about 190°,
   the bottom of the sealing element having a flanged portion against which the crimped portion bears in closed and sealing configuration to the extent of at least 50° and at most about 100°, and
   the end of the crimped portion abutting in self-limiting manner against a protrusion from the sealing element.

2. The element of claim 1 wherein
   the rim of the cell cup is preferably crimped to the extent of about 170° to about 190°.

3. The element of claim 1 wherein
   the top surface of the sealing element has an annular projection around its rim.

4. The element of claim 1 wherein
   the sealing element is provided with a frangible element.

5. The element of claim 1 wherein
   the sealing element has a rubber-like elastic properties.

* * * * *